US012682006B2

(12) United States Patent
Folliot et al.

(10) Patent No.: US 12,682,006 B2
(45) Date of Patent: Jul. 14, 2026

(54) METHOD FOR MANAGING A CONVOLUTIONAL COMPUTATION AND CORRESPONDING DEVICE

(71) Applicants:STMicroelectronics S.r.l., Agrate Brianza (IT); STMicroelectronics (Rousset) SAS, Rousset (FR)

(72) Inventors: Laurent Folliot, Gourdon (FR); Mirko Falchetto, Ossona (IT); Pierre Demaj, Nice (FR)

(73) Assignees: STMicroelectronics S.r.l., Agrate Brianza (IT); STMicroelectronics (Rousset) SAS, Rousset (FR)

( * ) Notice: Subject to any disclaimer, the term of this patent is extended or adjusted under 35 U.S.C. 154(b) by 1032 days.

(21) Appl. No.: 17/480,639

(22) Filed: Sep. 21, 2021

(65) Prior Publication Data

US 2022/0107990 A1    Apr. 7, 2022

(30) Foreign Application Priority Data

Oct. 1, 2020    (FR) ...................................... 2010063

(51) Int. Cl.
*G06F 17/15*            (2006.01)
(52) U.S. Cl.
CPC ................................... *G06F 17/15* (2013.01)
(58) Field of Classification Search
CPC ................... G06F 17/15; G06F 9/5016; G06F 9/3004–3005; G06N 3/04; G06N 3/0464;
(Continued)

(56) References Cited

U.S. PATENT DOCUMENTS 11,704,535 B1 *   7/2023   Vemuri ................ G06N 3/0464
                                                    706/31
2009/0157969 A1 *  6/2009   Harding .............. G06F 12/0842
                                                    711/E12.039
(Continued)

FOREIGN PATENT DOCUMENTS

CN         108241890 A     7/2018
CN         109325589 A     2/2019
(Continued)

OTHER PUBLICATIONS

Oxford English Dictionary (OED), "OED: Fill, v.", www.oed.com/oedv2/00084737 (Year: 1989).*
(Continued)

*Primary Examiner* — Andrew Caldwell
*Assistant Examiner* — Kenny K. Bui
(74) *Attorney, Agent, or Firm* — Slater Matsil, LLP

(57)            ABSTRACT
In an embodiment a method for managing a convolutional calculation carried out by a calculation unit adapted to calculate output data on output channels from convolution kernels applied to input data blocks on at least one input channel, wherein calculations on each input data block correspond respectively to an output datum on an output channel, and wherein the calculations with each convolution kernel correspond to the output data on each output channel respectively includes identifying a size of a memory location available in a temporary working memory of the calculation unit, pre-loading in the temporary working memory a maximum number of convolution kernels storable at the size of the memory; and controlling the calculation unit to calculate a set of output data calculable from pre-loaded convolution kernels.

20 Claims, 6 Drawing Sheets

(58) Field of Classification Search
CPC ... G06N 3/0475; G06N 3/0495; G06N 3/0499
See application file for complete search history.

(56) References Cited

U.S. PATENT DOCUMENTS

| | | | |
|---|---|---|---|
| 2017/0221176 A1 | 8/2017 | Munteanu et al. | |
| 2018/0341602 A1* | 11/2018 | Venkataraman | .... G06F 13/1673 |
| 2020/0074288 A1 | 3/2020 | Zhang et al. | |
| 2020/0218978 A1 | 7/2020 | Kopinsky | |

FOREIGN PATENT DOCUMENTS

| | | |
|---|---|---|
| CN | 109416743 A | 3/2019 |
| CN | 110751280 A | 2/2020 |

OTHER PUBLICATIONS

Oxford English Dictionary (OED), "OED: Full, a., n.3, and adv.", www.oed.com/oedv2/00090724 (Year: 1989).*

Bryant, R. E., O'Hallaron, D. R. (2011). Computer Systems: A Programmer's Perspective. Pearson. ISBN: 978-0-13-610804-7, Ch. 3 s. 3.8 & 3.12, pp. 153, 232-241, 256-267, (Year: 2011).*

Yang, Xuan, et al., "A Systematic Approach to Blocking Convolutional Neural Networks", arXiv:1606.04209, Jun. 14, 2016, 13 pages.

Chinese Notice of Grant of Invention Patent Right, with English translation, CN Application No. 202111152719.3, Issued Feb. 12, 2026, 10 pages.

Liu, Bo et al., "Accelerating CNN Models for Face Verification With Convolution Theorem," with English translation, Journal of Beijing University of Technology, vol. 43, No. 11, Nov. 2017, 8 pages.

* cited by examiner

[Fig 1]
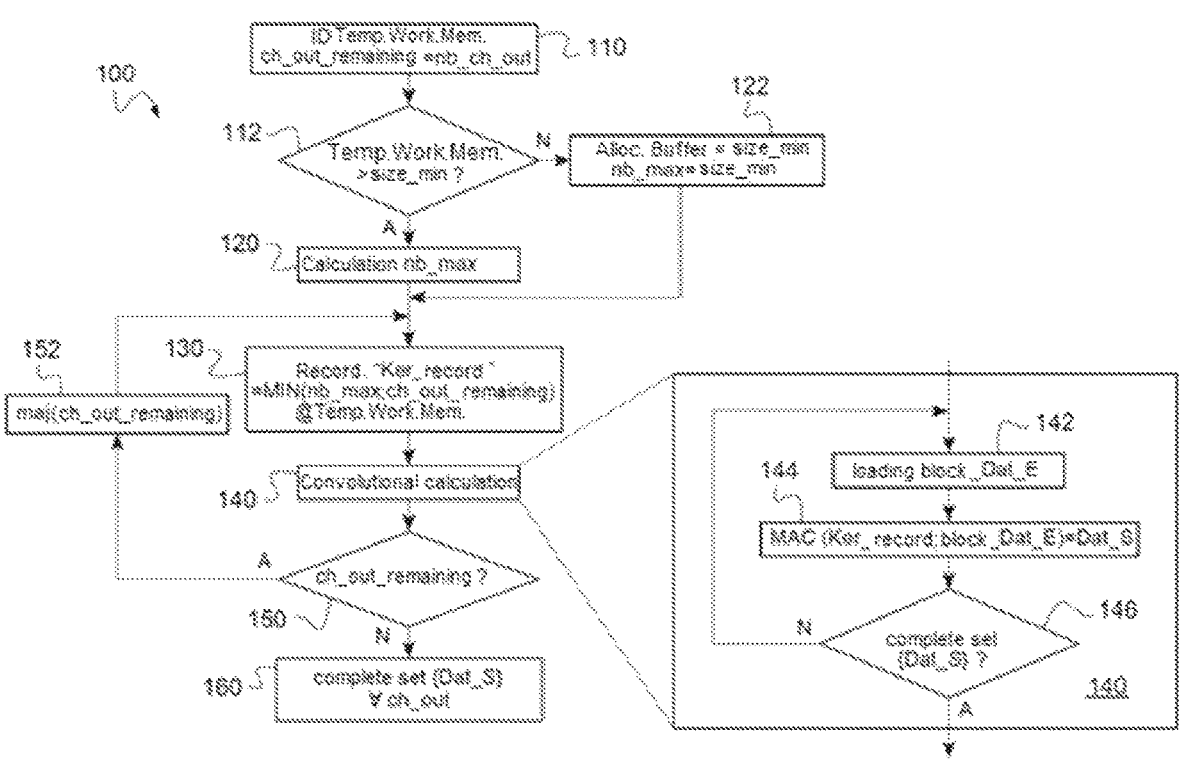

[Fig 2]
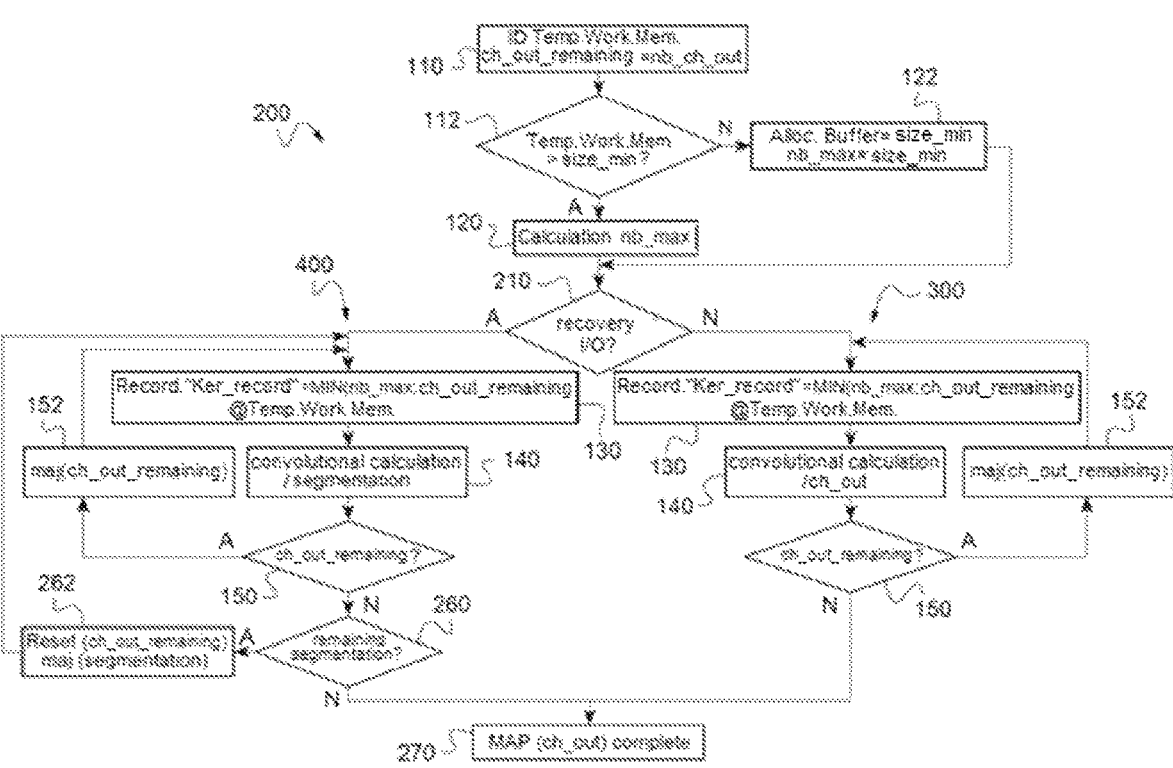

[Fig 3]
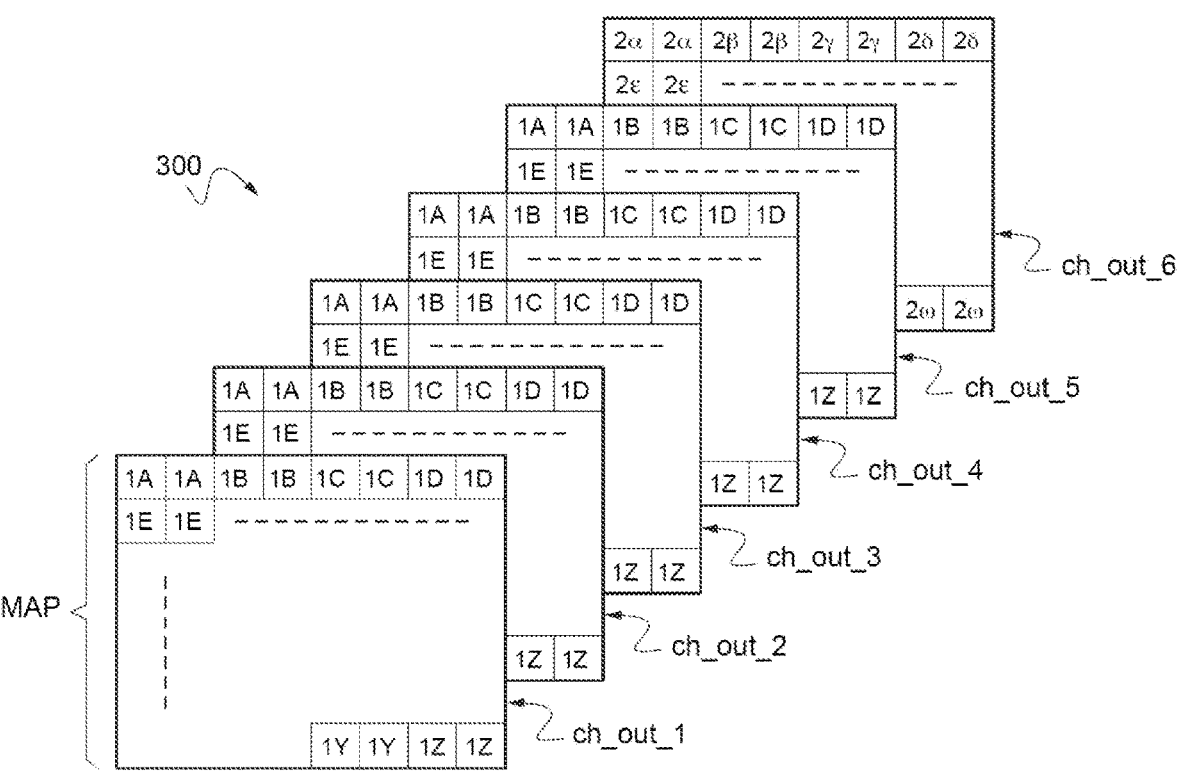

[Fig 4]
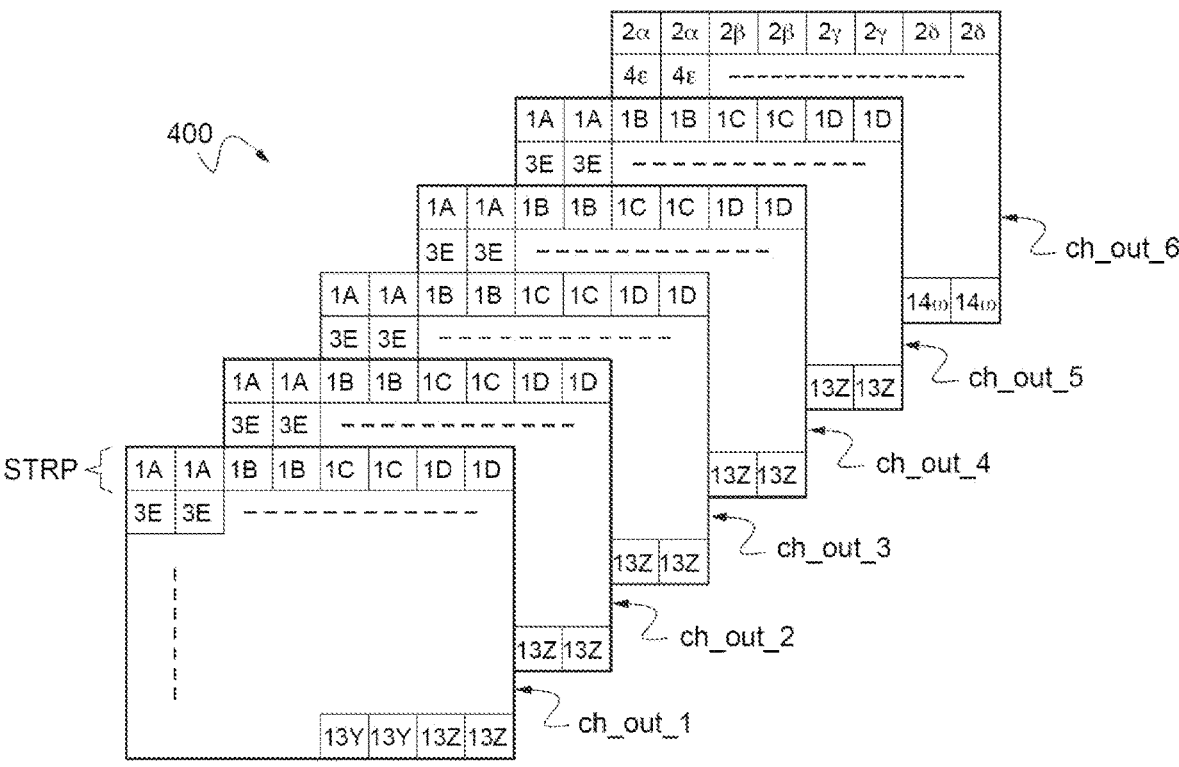

[Fig 5]
PRIOR ART
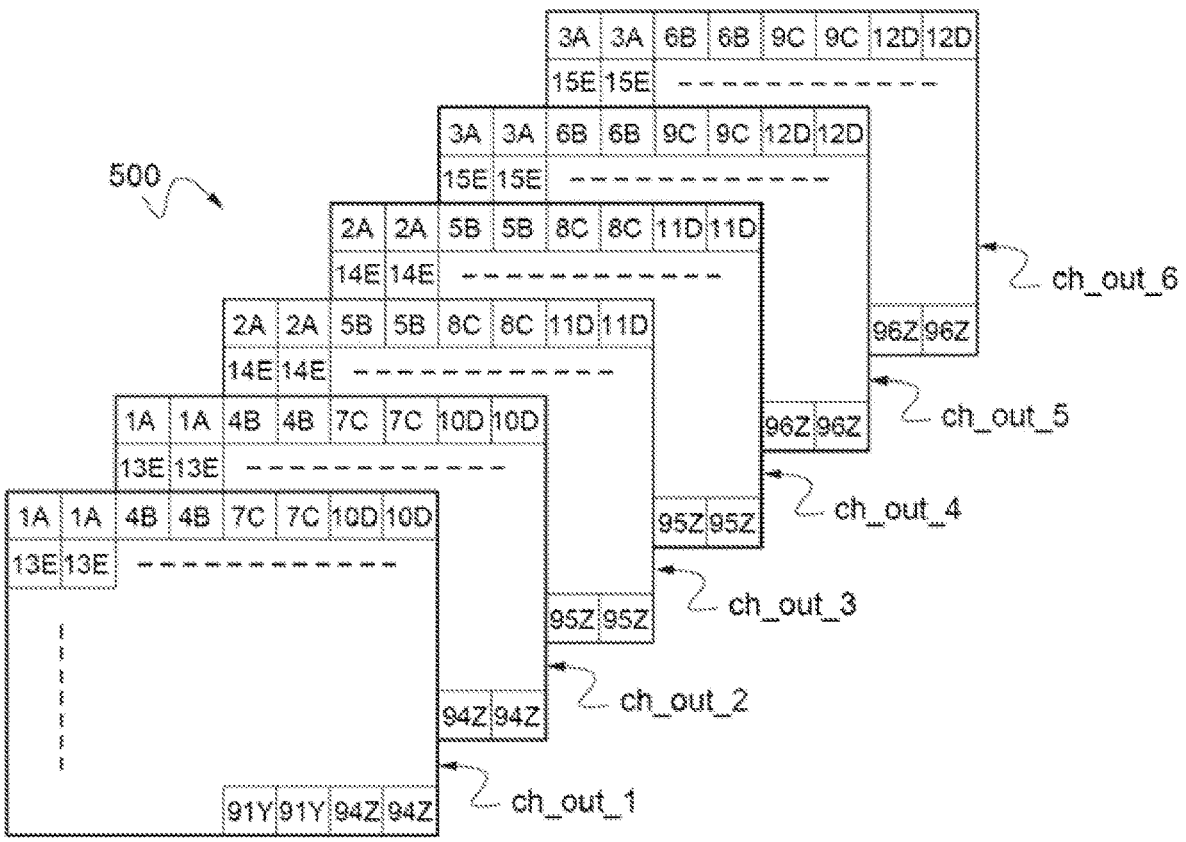

[Fig 6]
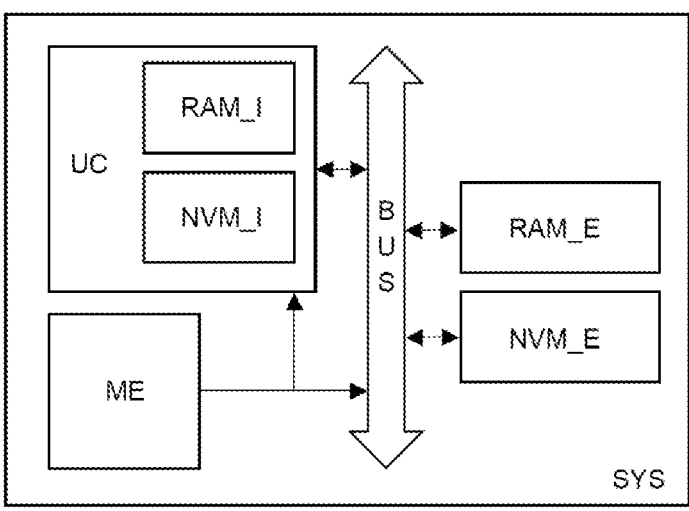

METHOD FOR MANAGING A CONVOLUTIONAL COMPUTATION AND CORRESPONDING DEVICE

CROSS-REFERENCE TO RELATED APPLICATIONS

This application claims the benefit of French Patent Application No. 2010063, filed on Oct. 1, 2020, which application is hereby incorporated herein by reference.

TECHNICAL FIELD

Implementations and embodiments relate to artificial neural networks operating convolutional calculations, in particular the management of convolutional calculations.

BACKGROUND

Mention can, for example, be made of Convolutional Neural Networks or CNN which are typically applied to the recognition of objects or people in images or videos, this is referred to as 2D convolution.

A convolutional neural network conventionally contains four layer types successively processing information: convolutional layers which process, for example, blocks of an image one after the other; activation layers, typically nonlinear functions, which allow to improve the relevance of the result of the convolution layers; pooling layers which allow to reduce the dimensions of the layers; and fully-connected layers (or dense layers) which connect all neurons of one layer to all neurons of the previous layer.

For each layer, input data arrives on input channels from a previous layer, and output data is delivered on output channels. The input and output channels correspond to memory locations, for example of a random access memory. The set of output channels is called a "feature map".

Convolution layers typically correspond to a scalar product of input data and convolution kernel weight data. Weight data means the parameters of a convolution operation relating to a given convolution kernel.

Briefly, the principle of convolutions, in particular 2D convolutions, is to scan the input channels with a window projected onto input data blocks, and to calculate the scalar product of each input data block with the convolution kernels. The scalar product of each input data block corresponds to an output datum, on the output channels corresponding respectively to each convolution kernel.

It will be noted that a convolution kernel corresponds to an output channel, and can comprise a number of components equal to the number of input channels, each component can thus be dedicated to an input channel. Consequently, the "absolute" size of such a convolution kernel, that is to say the number of kernel weight data, will have the size of a component, equal to the size of the window for example 3*3 pixels, multiplied by the number of input channels. Weights are typically stored in a non-volatile memory.

Convolutional neural networks "CNN" are widely used in artificial intelligence. The executions of calculations by convolutional neural networks are quite demanding in non-volatile memory capacity to store the weights, in volatile memory capacity for input/output data and in calculation cycles resulting in high inference times (inference time is the usual term in the field of artificial intelligence given to the time necessary to perform the task for which the neural network has been configured, or trained within the framework of self-learning techniques).

There is a need to reduce the inference time of calculations performed in convolutional neural networks.

Existing solutions typically have the disadvantage of not offering an advantageous compromise both in reducing inference time and reducing memory occupancy.

Indeed, for example techniques of the "TVM" type generating a specific code for each layer in order to avoid executions in loops, can reduce the number of cycles but have a significant impact on the size of the non-volatile memory. Also, the techniques known as "weight stationary", or "feature Stationary" consist in allocating more volatile memory to accelerate the calculations.

However, the sizes of the non-volatile memories and of the volatile memories are directly correlated to the final cost of the solution. The problem of price and the problem of compromise between inference time and memory space have an even greater impact in the context of inexpensive devices having limited (random-access and non-volatile) memory and calculation speed resources.

SUMMARY

Embodiments provide a great reduction in the inference time on 2D convolutions. Further embodiments provide an interference time close to the theoretical limit in number of cycles per convolutional calculation operation, without increasing volatile and non-volatile memories.

According to one embodiment a method for managing a convolutional calculation is provided, wherein the method is carried out by a calculation unit adapted to calculate output data on output channels from convolution kernels applied to input data blocks on at least one input channel, the calculations on each input data block corresponding to each output datum respectively on the output channels, and the calculations with each convolution kernel corresponding to the output data on each output channel respectively.

According to an embodiment, the method comprises:

identifying the size of a memory location available in a temporary working memory of the calculation unit;

pre-loading in the temporary working memory the maximum number of convolution kernels that can be stored at this size; and controlling the calculation unit to calculate a set of output data that can be calculated from pre-loaded convolution kernels.

The temporary working memory of the calculation unit, usually called "scratch memory", is a memory location whose lifespan is temporary, moreover always provided by any type of code generator or compiler. The size of the available memory location depends on each application and is not always predictable.

The method according to this embodiment provides for an optimal use of the temporary working memory on a case-by-case basis, by pre-loading therein a maximum of convolution kernels according to the available size identified, which allows reducing the number of processes of recovery and loading of convolution kernels used in calculations.

It will be noted that the method provides for optimal use of the available temporary working memory, that is to say that the method does not provide for a memory allocation fixed in advance.

Furthermore, the convolutional calculation performed by the calculation unit is controlled after the pre-loading the kernels, and for a set of output data resulting from a convolution with these pre-loaded kernels. In other words, each pre-loaded convolution kernel is fully used during the calculation, which again allows to reduce the number of processes for recovering and loading convolution kernels.

The consequence of the combination of these two mechanisms of reducing the number of processes implemented for the recovery and loading of the convolution kernels offers a considerable time saving. The first results, simulated for a neural network topology of the 2D convolutional layer type, reach a reduction of 98% of the total time dedicated to data loadings compared to a conventional method, and a gain of 30% to 50% on the global inference time of a complete neural network. Of course, the performance gain will depend on the topology of the network and the conditions of implementation.

Finally, this approach is generic and can be applied to any organisation of input/output data and convolution kernel data allowing in particular to optimise memory use, for example an organisation exploiting the fragmentation of memory.

According to one embodiment, the control of the calculation unit to calculate the set of output data that can be calculated from pre-loaded convolution kernels comprises successive loadings in the calculation unit of the input data blocks corresponding to the output data of the set.

In other words, the management method provides for scanning all input data blocks that can be used with the pre-loaded kernels, in order to calculate the maximum output data from the loaded kernels.

In one implementation, the method comprises repeating the pre-loading step and the control step, until the set of output data in all output channels is calculated.

Indeed, if all the convolution kernels cannot be loaded in the temporary working memory, then after having calculated the maximum output data of the output channels corresponding to the pre-loaded kernels, the process is repeated with other convolution kernels in order to calculate the maximum of output data of the output channels corresponding to these other convolution kernels.

Consequently, the number of times that input data blocks are loaded in the processing unit is greater than in conventional methods, but this loss is largely compensated by the gain in the number of times the convolution kernels are recovered and loaded compared to conventional methods.

According to one embodiment, the set of output data that can be calculated corresponds to the maximum size of the output data that can be received at one time in each output channel, the set being able to comprise the entire output data of each output channel, or comprise only a segmentation of the output data of each output channel.

For example, the segmentation of the output data of each output channel corresponds to a row or a packet of rows of each output channel.

Indeed, techniques for recovering the output channels on the input channels can allow to optimise memories that store input and output data. In such a situation, the maximum size of the output data that can be received at one time in each output channel is limited to a segmentation, for example to a row or a packet of rows according to the organisation of the memory recovery, in order to not to corrupt the input data by overwriting it with the output data.

According to one embodiment, if the set only comprises a segmentation of the output data of each output channel, then the repetition of the pre-loading step and of the control step comprises:

a) repeating the pre-loading step with convolution kernels that are different from those of the previous pre-loading step and repeating the control step for the same segmentation, until all the output data of the segmentation is calculated for all output channels, and, furthermore, b) renewing step a) for further segmentations, until the output data is calculated in all the segmentations of all the output channels.

In other words, in this embodiment the output data is calculated so as to first fill a segmentation, such as a row, in all output channels. To reach all the output channels, the pre-loading step is repeated with the corresponding output kernels to successively cover the segmentation of all the output channels. Then the process starts again for the next segmentation, for example the next row, of all the output channels.

Despite the repetition of the steps of pre-loading the convolution kernels for each segmentation, the method according to this implementation offers a time saving reaching an 89.7% reduction in the time dedicated to data loadings compared to a conventional method.

According to one embodiment, if the size of the memory location available in the temporary working memory is smaller than a minimum size threshold, then the identification step further comprises an allocation of a memory location of a buffer memory of the calculation unit having the size of the minimum size threshold, and the pre-loading is performed in the allocated memory location, and is of a maximum number of convolution kernels that can be stored at this minimum size threshold.

In this embodiment, a memory location is allocated and thus the occupied memory size is slightly increased compared to one of the implementations defined above. However, this increase in memory occupancy, which may be equal to the size of two convolution kernels, does not introduce excessive additional cost, in particular with respect to the gain obtained in calculation time.

According to one embodiment, the convolution kernels comprise weight data, and the pre-loading step comprises reorganising the weight data of the convolution kernels to optimise the calculation of the output data by the calculation unit.

In other words, the pre-loading of the weight data is arranged so as to reduce the inference time regardless of the storage mapping of the convolution kernels.

It will be noted that the input data can also be reorganised in this regard upon successive loadings of the input data blocks.

According to one embodiment, the convolution kernels comprise weight data, and the output data calculation comprises operations of multiplying and accumulating the input data of the blocks loaded with the weight data of the pre-loaded convolution kernels.

According to one embodiment, before the pre-loading of the convolution kernels in the temporary working memory, the convolution kernels are stored in a non-volatile memory which is internal or external to the calculation unit, and, during the control of the calculation unit, the input data and the output data are stored in a volatile memory which is internal or external to the calculation unit.

Indeed, the reduction in the amount of convolution kernel recovery and loading process by the method according to this aspect saves time even in the case of non-volatile memory internal to the calculation unit. The gain is however greater in the case of an external non-volatile memory. Also, the time saving thus obtained remains greater than the loss of time caused by the increase in the number of loading of the input data blocks, even when the input channels are stored in an external memory.

The method according to these embodiments can be implemented by software or by hardware such as an integrated device including processing means intended to organise and control the execution of the calculation, for example in a state machine logic circuit.

Embodiments provide a computer program product comprising instructions which, when the program is executed by a computer, lead the latter to implement the method as defined above.

Further embodiments provide a computer readable medium comprising instructions which, when they are executed by a computer, lead the latter to implement the method as defined above.

According to another embodiment a device is provided wherein the device, for example, an integrated device comprises processing means configured to manage a convolutional calculation carried out by a calculation unit adapted to calculate output data on output channels from convolution kernels applied to input data blocks on at least one input channel, the calculations on each input data block corresponding respectively to each output datum on the output channels, and the calculations with each convolution kernel corresponding to the output data on each output channel respectively, characterised in that the processing means are further configured for:

identifying the size of a memory location available in a temporary working memory of the calculation unit;

pre-loading in the temporary working memory a maximum number of convolution kernels that can be stored at this size; and controlling the calculation unit to calculate a set of output data that can be calculated from pre-loaded convolution kernels.

According to one embodiment, the processing means are configured to control the calculation unit to calculate the set of output data that can be calculated from pre-loaded convolution kernels by successively loading in the calculation unit input data blocks corresponding to the output data of the set.

According to one embodiment, the processing means are configured to repeat the pre-loading and the control, until the set of output data in all output channels is calculated.

According to one embodiment, the set of output data corresponds to the maximum size of the output data that can be received at one time in each output channel, the set being able to comprise the entire output data of each output channel, or comprise only a segmentation of the output data of each output channel.

According to one embodiment, the segmentation of the output data of each output channel corresponds to a row or to a packet of rows of each output channel.

According to one embodiment, if the set only comprises a segmentation of the output data of each output channel, then, to repeat the pre-loading and the control, the processing means are configured for:

a) repeating the pre-loading with convolution kernels different from those of the previous pre-loading and repeating the control for the same segmentation, until all the output data of the segmentation is calculated for all the output channels, and, furthermore, b) renewing a) for other segmentations, until the output data is calculated in all the segmentations of all the output channels.

According to one embodiment, if the size of the memory location available in the temporary working memory is smaller than a minimum size threshold, then the processing means are configured to allocate a memory location of a buffer memory of the calculation unit having the size of the minimum size threshold, and pre-load in the allocated memory location a maximum number of convolution kernels that can be stored at this minimum size threshold.

According to one embodiment, the convolution kernels comprise weight data, and the processing means are configured, during the pre-loading, to reorganise the weight data of the convolution kernels to optimise the calculation of the output data by the calculation unit.

According to one embodiment, the convolution kernels comprise weight data, and the calculation unit is configured to calculate the output data by operations of multiplying and accumulating the input data of the blocks loaded with the weight data of the pre-loaded convolution kernels.

According to yet other embodiments a system is provided wherein the system comprises a device as defined above, the calculation unit, a non-volatile memory which is internal or external to the calculation unit intended to store the convolution kernels, and a volatile memory which is internal or external to the calculation unit intended to contain the input data and the output data.

BRIEF DESCRIPTION OF THE DRAWINGS

Other advantages and features of the disclosure will become apparent upon examining the detailed description of implementations and embodiments, which are in no way limiting, and the appended drawings, wherein:

FIG. 1 shows a management procedure for a convolutional calculation of a neural network according to a first embodiment;

FIG. 2 shows a management procedure for a convolutional calculation of a neural network according to a second embodiment;

FIG. 3 shows an implementation of the second embodiment in case I/O recovery is negative;

FIG. 4 shows an implementation of the second embodiment in case I/O recovery is affirmative;

FIG. 5 shows an implementation of a conventional method for managing a convolutional calculation with the same input data and the same convolution kernels, to achieve the same output data, for comparison; and FIG. 6 illustrates an exemplary system adapted to implement the method according to embodiments.

DETAILED DESCRIPTION OF ILLUSTRATIVE EMBODIMENTS

FIG. 1 shows a management procedure 100 of a convolutional calculation of a neural network, for example of the 2D convolution type.

The mathematical operations of the convolutional calculation are carried out by a calculation unit UC (FIG. 6) adapted to apply convolution kernels to input data blocks of at least one input channel in order to calculate output data on output channels.

For example, in the case where the input data are the pixels of an "RGB" (red-green-blue) image then the input data is provided on an input channel of a red "R" component, an input channel of a green "G" component and an input channel of a blue "B" component. Convolution kernels consist of a matrix of weight data having the size of a convolution window, for example 3*3 weight data. A scalar product, that is to say a multiplication and accumulation operation, is calculated between the pixels of an input datum block having the size of the convolution window, for each input channel, and the convolution kernel weight data.

Generally, but not necessarily, a convolution kernel includes a weight data matrix dedicated to each input channel. The sum of the scalar products obtained on each input channel constitutes an output datum at a position corresponding to the convolution window, in an output channel. The same operation with another convolution kernel provides an output datum at the same position in another output channel. The convolution window scans the whole of each input channel to provide all the output data, otherwise known as a "feature map". The output channels of the feature map can then be taken as input channels for a next layer of the neural network.

In summary, the calculations on an input data block result in an output datum on the output channels, and the calculations with a convolution kernel result in the output data on an output channel.

The calculations carried out on all the input data blocks, scanned on the input channels, with each of the convolution kernels, thus result in the entire output data on all the output channels, called a "feature map".

The management method 100 controls and organizes the progress of the convolutional calculation, in particular the selection and access to the input data and to the weight data used in the calculations. The weight data is usually stored in a non-volatile memory, while the input and output data is usually stored in a volatile memory.

In a preliminary phase of the calculation, the calculation unit is programmed to execute instructions implementing the convolutional calculation, and a temporary working memory of the calculation unit is provided by any code generator or compiler.

The temporary working memory of the calculation unit, usually called "scratch memory", is a memory location whose lifespan is temporary, for example typically allowing to temporarily store intermediate data for performing calculation operations. The size of the available memory location depends on each application and is not always predictable, but can nevertheless be known at the output of a code generator.

The method comprises an identification no of the size of a memory location available in the temporary working memory Temp.Work.Mem of the calculation unit.

During this first identification phase, the method can also comprise an initialization of a parameter ch_out_remaining representative of the number of output channels remaining to be calculated. This parameter is initialized to the total number of output channels nb_ch_out of the running convolutional layer, which is also the number of convolution kernels used by that layer.

Advantageously, the method can provide for a test 112 checking whether the size of the memory location available in the scratch memory Temp.Work.Mem is greater than a minimum size threshold size_min.

The minimum size threshold size_min is advantageously equal to the size of two convolution kernels.

In the affirmative A of test 112 (that is to say the size of the location available in the temporary working memory is greater than the minimum size threshold size_min), the maximum number nb_max of convolution kernels that can be stored in the available location of the temporary working memory is calculated 120.

Calculation 120 can be performed from the identified size and dimensions of the convolution kernels, for example: nb_max=PE (size/Kx*Ky*nb_ch_in), with "PE( )" the integer function, "size" the identified size, "Kx" and "Ky" the horizontal and vertical dimensions of the convolution kernel weight data matrices, and "nb_ch_in" the number of input channels.

In some cases, which can become the majority of cases when the dimensions Kx, Ky and the number nb_ch_in are large enough, the size of the available memory location is insufficient.

In this regard, in the negative N of test 112 (that is to say the size of the memory location available in the temporary working memory is smaller than the minimum size threshold size_min), a memory location of a buffer memory of the calculation unit is allocated 122.

The size of the allocated buffer location is advantageously equal to the size of the minimum size threshold size_min. In this case, the value nb_max is set to size_min.

Hereinafter, it will be considered that the location allocated in the buffer memory constitutes the temporary working memory Temp.Work.Mem.

The method then comprises a pre-loading 130 in the temporary working memory Temp.Work.Mem of the maximum number nb_max of convolution kernels that can be stored at this size.

If the size available in the temporary working memory Temp.Work.Mem is greater than all the remaining convolution kernels ch_out_remaining, then the only remaining number of convolution kernels is pre-loaded.

Once the convolution kernels are pre-loaded in the temporary working memory of the calculation unit, the convolutional calculation is controlled 140.

In this regard, the pre-loading step 130 of the method 100 can advantageously implement a technique for reorganizing the weight data of the convolution kernels, allowing optimizing the calculation 140 of the output data by the calculation unit.

The convolutional calculation performed by the calculation unit is controlled for all possible output data, which results from a convolution with the pre-loaded kernels.

Thus, the convolutional calculation control 140 comprises a succession (146-N) of loadings 142 of input data blocks block_Dat_E in the calculation unit. For each loading 142, the calculation unit carries out a sequence of multiplication and accumulation MAC (scalar product) of the input data of the loaded block block_Dat_E with the weight data of the convolution kernels Ker_record which were pre-loaded in step 130, in order to provide an output datum Dat_S.

As long as the set of output data Dat_S that can be calculated from the pre-loaded convolution kernels is not complete (146-N), the next input datum block is loaded 142 and the calculation 146 of the corresponding scalar product Dat_S is executed.

When the set of output data Dat_S that can be calculated from the pre-loaded convolution kernels is complete (146-A), then the method comprises repeating 150 the pre-loading step 130 and the convolutional calculation control step 140, until all the output data in all output channels is calculated 160.

In this regard, a test 150 is provided to check whether there are any remaining output channels ch_out_remaining to be calculated.

If the affirmative A of test 150, then the remaining number of output channels ch_out_remaining is updated 152, and the pre-loading step 130 and the convolutional calculation control step 140 are repeated with the maximum number nb_max of convolution kernels corresponding to the remaining output channels.

There again, if the number of remaining convolution kernels ch_out_remaining is less than the maximum number nb_max, then only the remaining number of convolution kernels is pre-loaded.

In the negative N of test 150, the set of output data DatS that can be calculated is obtained in all output channels 160.

The set of output data that can be calculated is limited by the maximum size of output data that can be received at one time in each output channel.

Consequently, the set of output data that can be calculated corresponds to the maximum size of the output data that can be received at one time in each output channel.

Limiting the maximum size of output data that can be received at one time in each output channel can typically arise from the use of the memory wherein the input data and the output data are stored. Indeed, there are techniques allowing optimizing the size of this memory by overlapping or interleaving the input data and the output data. In this type of technique, not all the output data can be written to memory without overwriting (or corrupting) input data that should still be used for subsequent calculations.

On the other hand, if the organization of the memory allows it, for example if there is a memory location dedicated to the output data distinct from the input data, then the size of the output data that can be received at one time in each channel can contain the entire output data of the output channel.

The set of output data that can be calculated can thus comprise the entire output data of each output channel, or comprise only a segmentation of the output data from each output channel. The segmentation can for example correspond to a row or to a packet of rows of output data.

FIG. 2 illustrates the convolutional calculation management method 200 as described previously in relation to FIG. 1, distinguishing the two possibilities mentioned above and relating to the sets of output data that can be calculated. The steps described in relation to FIG. 1 bear the same references and will not all be detailed again.

In particular, the preliminary steps 110, 112, 120 and 122 are strictly identical.

At the end of the preliminary steps 110-122, a test 210 is provided, for example, to check whether the input and output I/O data are recorded using an overlapping or interleaving technique.

Test 210 is more broadly intended to identify whether the maximum size of the output data that can be received at one time in each output channel corresponds to an output channel segmentation.

In the negative N of test 210 (that is to say if the maximum size of the output data that can be received at one time in each output channel corresponds to the entire output channel), then the steps of pre-loading 130, calculation control 140 and their repetitions 150, 152 are implemented in a branch 300, without particular distinction compared to the manner described in relation to FIG. 1.

The set of output data Dat_S, obtained at each calculation cycle controlled in step 140, thus corresponds to all the output data of each integer output channel/ch_out corresponding to the pre-loaded convolution kernels.

In other words, for the calculation of nb_max integer output channels, a single phase of pre-loading the convolution kernels 130 was implemented.

Then, the convolution kernels corresponding to the output channels remaining to be calculated (150-152) are pre-loaded, and the entire feature map MAP (ch_out) is obtained 270.

In the affirmative A of test 210 (that is to say if the maximum size of the output data that can be received at one time in each output channel corresponding to an output channel segmentation), then the steps of pre-loading 130, calculation control 140 and their repetitions 150, 152 are implemented in a branch 400, in a similar manner to the manner described in relation to FIG. 1 but with, furthermore, a conditioned repetition 260 on the remaining segmentations of the output channels.

Indeed, the repetitions of the pre-loading step 130 with convolution kernels different from those of the previous pre-loading step 130, and the repetitions of the calculation control step 140 for the same segmentation, results in calculation of all the output data of this segmentation, in all output channels.

Thus, to calculate the output data belonging to the following segmentation, the method comprises, on the one hand a test 260 provided in order to test whether there remains a segmentation to be calculated.

In the affirmative A of test 260, on the one hand the parameter ch_out_remaining is reset to its initial value, that is to say ch_out_remaining=nb_ch_out, and the output channel segmentation is updated during a step 262.

And on the other hand, the steps of pre-loading 130, of calculation control 140 and their repetitions 150,152 are renewed, but for the following segmentation of the output channels, until the output data is calculated in all the segmentations of all the output channels.

It should be noted that an output channel segmentation corresponds to a group of output data positioned in the output channels, typically a row or a packet of rows of the output channels. Thus, renewing the steps of pre-loading 130 and of calculation control 140 for another segmentation, corresponds to normally pre-loading the convolution kernels, and to controlling the calculations by loading other input data blocks corresponding to the positions of the output data belonging to the other segmentation.

Consequently, when all output channel segmentations of all the output channels are calculated, the entire feature map MAP (ch_out) is obtained 270.

Reference is now made to FIGS. 3 to 5.

FIG. 3 schematically shows an implementation of the method 200 described in relation to FIG. 2, in the case 300 of the negative N of test 210.

FIG. 4 schematically shows an implementation of the method 200 described in relation to FIG. 2, in the case 400 of the affirmative A of test 210.

FIG. 5 schematically shows an implementation of a conventional method 500 for managing a convolutional calculation with the same input data and the same convolution kernels, to achieve the same output data, for comparison.

In FIGS. 3, 4 and 5, six output channels ch_out_1-ch_out_6 are represented in the form of output data matrices, each output datum being represented by a box containing a number and a letter.

It is recalled that each output datum results from a calculation between an input data block loaded in the calculation unit and a convolution kernel pre-loaded in the temporary working memory of the calculation unit.

In each box, the number is changed (numerically incremented) each time the convolution kernel used for the calculation of the corresponding output datum had to be pre-loaded; and the letter is changed (incremented in alphabetical order) each time the input data block used to calculate the corresponding output datum had to be loaded.

The use of the Latin and Greek alphabets is a simple notation using for convenience the first letters A-E and a-c to denote the first loadings of input blocks and the last letters Z and co to denote the last loadings of input blocks, and is in no way intended to limit the total number of loadings by the number of letters composing the respective alphabets.

It will be noted that the examples in FIGS. 3 to 5 correspond to a convolutional calculation technique usually called "dual-MAC", implemented by the calculation unit. The dual-MAC techniques are well known to the person skilled in the art, and briefly allow, for example, to calculate two output data on two output channels, from an adapted input datum block and from two convolution kernels, simultaneously by a single multiplication and accumulation mechanism.

FIGS. 3 and 4 correspond to a case where the size of the memory location available in the temporary working memory of the calculation unit can contain a maximum of five convolution kernels (nb_max=5).

Thus, in the example of FIG. 3, a first pre-loading step "1" allows to store in the temporary working memory the first five convolution kernels.

The set of input data blocks is scanned "A", "B", "C", "D", "E", . . . , "Y", "Z" and combined (MAC) with the pre-loaded convolution kernels "1A" . . . "1Z", resulting in the complete set MAP of the output data of the five output channels ch_out_1, ch_out_2, ch_out_3, ch_out_4, ch_out_5 corresponding to the five pre-loaded convolution kernels.

Then, with only one last convolution kernel remaining, a second pre-loading step "2" allows to store in the temporary working memory the convolution kernel corresponding to the sixth output channel ch_out_6.

The set of input data blocks is scanned again "α", "β", "γ", "δ", "ε", . . . , "ω" and combined (MAC) with the pre-loaded convolution kernels "2α" . . . "2ω", resulting in the complete set MAP of the output data of the sixth output channel ch_out_6 corresponding to the pre-loaded convolution kernel.

In the example of FIG. 4, a first pre-loading step "1" allows to store in the temporary working memory the first five convolution kernels.

Input data blocks corresponding to the first segmentation of the output channel, for example the first row STRP, is scanned "A", "B", "C", "D", and combined (MAC) with the pre-loaded convolutional kernels "1A" . . . "1D", resulting in the first row STRP of output data of the five output channels ch_out_1, ch_out_2, ch_out_3, ch_out_4, ch_out_5 corresponding to the five pre-loaded convolution kernels.

A second pre-loading step "2" allows to store in the temporary working memory the convolution kernel corresponding to the sixth output channel ch_out_6.

The input data blocks corresponding to the output channel segmentation is scanned "α", "β", "γ", "δ", and combined (MAC) with the pre-loaded convolution kernels "2α" . . . "2δ", resulting in the first row STRP of output data of the sixth output channel ch_out_6 corresponding to the pre-loaded convolution kernel.

A third pre-loading step "3" allows to store in the temporary working memory the first five convolution kernels, and the input data blocks corresponding to the following segmentation are scanned "E", . . . , and combined (MAC) with the pre-loaded convolution kernels "3E" . . . , resulting in the second row STRP of output data of the five output channels ch_out_1, ch_out_2, ch_out_3, ch_out_4, ch_out_5 corresponding to the pre-loaded convolution kernels.

A fourth pre-loading step "4" allows to store in the temporary working memory the convolution kernel corresponding to the sixth output channel ch_out_6, and the input data blocks corresponding to the following segmentation are scanned "ε", . . . , and combined (MAC) with the pre-loaded convolution kernels "4ε", . . . , resulting in the second row STRP of output data of the sixth output channel ch_out_6 corresponding to the pre-loaded convolution kernel.

The steps of pre-loading and scanning the input data blocks corresponding to the following segmentations are renewed until the output data is calculated in all the segmentations of all the output channels . . . , "13Y", "13Z" and . . . , "14ω".

In the example of FIG. 5, the conventional method 500 firstly proceeds to the loading of an input datum block "A", then, for this input data block "A", to three successive loadings "1", "2", "3" of pairs of convolution kernels corresponding respectively to the output data "1A", "2A", "3A" on the first and second output channels ch_out_1, ch_out_2, the third and fourth output channels ch_out_3, ch_out_4, and the fifth and sixth output channels ch_out_5, ch_out_6.

Then, the conventional method first proceeds to the loading of the next input datum block "B", then, for this input data block "B", to the three successive loadings of the pairs of convolution kernels "4", "5", "6" corresponding to the output data "4B", "5B", "6B" on the respective pairs of output channels.

The process of three loadings of pairs of convolution kernels is repeated for each input data block loaded during the input channel scan.

It will be noted that the convolution kernel loadings are performed in pairs due to the dual-MAC technique mentioned above, and three pairs per input data block due to the total number of six kernels. Without the dual-MAC technique, there are conventionally six successive loadings of a single convolution kernel for each input data block.

The conventional method thus uses, in this arbitrary example, ninety-six (96) loadings of the six convolution kernels, and a complete AZ alphabet of loadings, for example fifty-six (56) loadings of input data blocks.

In comparison, the method 300 uses, in the same arbitrary example, two (2) pre-loadings of the six convolution kernels, and two equivalent alphabets, that is to say one hundred and twelve (112) loadings of input data blocks.

In comparison, the method 400 uses, in the same arbitrary example, fourteen (14) pre-loadings of the six convolution kernels, and two equivalent alphabets, that is to say one hundred and twelve (112) loadings of input data blocks.

Table 1 below shows results, represented in bold, of the conventional method 500 and of the advantageous methods 300 and 400 of the implementations described above.

The rows of Table 1 correspond to the following elements:
nb_ch_in: the number of input channels;
Kx: the number of weight data columns of a convolution kernel;
Ky: the number of rows of weight data of a convolution kernel;
nb_max: the maximum number of convolution kernels that can be stored at the size of the memory location available in the temporary working memory of the calculation unit;
nb_ch_out: the number of output channels;

out_x: the number of columns of output data of an output channel;

out_y: the number of rows of output data of an output channel;

LA: the loading time of an input data block, arbitrarily in number of cycles (c);

LW: the loading time of a convolution kernel, arbitrarily in number of cycles (c);

500: the total cumulative time of the loadings of input data blocks and convolution kernels of the conventional method 500, arbitrarily in millions of cycles (Mc);

300: the total cumulative time of the loadings of input data blocks and convolution kernels of the method 300, arbitrarily in millions of cycles (Mc);

400: the total cumulative time of loadings of input data blocks and convolution kernels of the method 400, arbitrarily in millions of cycles (Mc).

It will be noted that the methods 300 and 400 offer a cumulative total time of the loading of input data blocks and convolution kernels much less than the conventional method 500 in all cases C1-C7 of Table 1, except case C3.

In particular, case C7 will be noted, for which the methods 300 and 400 offer a time saving of 98% and 89.7% respectively compared to the conventional method 500. The case C7 is characterized in particular by a relatively large number nb_max (nb_max=30) and by $LW \gg LA$ ($3 \gg 1$).

Moreover, it will be noted that the case C3, for which the method 300 is substantially equivalent to the conventional method 500 and the method 400 is slightly slower than the conventional method 500 (+8%), is characterized by a minimum number nb_max (nb_max=2) and by $LW < LA$ ($2 < 1$).

Case C3 in fact corresponds to a theoretical sub-optimization of the calculation conditions. Indeed, in practice, input data is typically stored in a volatile memory, while convolution kernel weight data is typically stored in a non-volatile memory. However, the time of access to the data of a volatile memory LA is usually, and in the vast majority of cases, faster than the time of access to the data of a non-volatile memory LW (and therefore, usually, $LW > LA$).

TABLE 1

|  | C1 | C2 | C3 | C4 | C5 | C6 | C7 |
|---|---|---|---|---|---|---|---|
| nb_ch_in | 3 | 128 | 128 | 128 | 128 | 128 | 128 |
| Kx | 3 | 3 | 3 | 3 | 3 | 3 | 3 |
| Ky | 3 | 3 | 3 | 3 | 3 | 3 | 3 |
| nb_max | 16 | 2 | 2 | 2 | 30 | 30 | 30 |
| nb_ch_out | 16 | 256 | 256 | 256 | 256 | 256 | 256 |
| out_x | 88 | 11 | 11 | 11 | 11 | 11 | 11 |
| out_y | 88 | 11 | 11 | 11 | 11 | 11 | 11 |
| LA (c) | 2 | 1 | 2 | 1 | 1 | 3 | 1 |
| LW (c) | 1 | 1 | 1 | 2 | 1 | 1 | 3 |
| 500 (Mc) | 3.8 | 35.8 | 36 | 71.5 | 35.8 | 36.1 | 107.2 |
| 300 (Mc) | 0.4 | 18.1 | 36 | 18.4 | 1.5 | 4.1 | 2.1 |
| 400 (Mc) | 0.4 | 21.1 | 38.9 | 24.3 | 4.5 | 7 | 11 |

FIG. 6 illustrates an example of a system SYS adapted to implement the method described in relation to FIGS. 1 to 4.

The system SYS comprises a device comprising processing means ME, otherwise called "state machine", a calculation unit UC including an internal non-volatile memory NVM_I and an internal volatile memory RAM_I. The system SYS further includes an external non-volatile memory NVM_E and an external volatile memory RAM_E.

The processing means of the state machine ME, and the calculation unit UC can for example be implemented in the form of devices integrated into an integrated circuit or into a system on a chip.

The external memories NVM_E, RAM_E are connected to the calculation unit UC by means of a communication interface such as a BUS of the "SPI" (acronym well known to the person skilled in the art of "Serial Peripheral Interface"), "I$^2$C" (acronym well known to the person skilled in the art of "Inter-Integrated Circuit") type, buses of the "AMBA" (acronym well known to the person skilled in the art of "Advanced Microcontroller Bus Architecture") family as part of a "system-on-chip" type system or any other adapted type of bus.

The external non-volatile memory NVM_E is for example an EEPROM memory or a "Flash" memory, such as a "Flash QSPI" memory adapted for a bus of the SPI type, or any other type of adapted memory.

The external volatile memory RAM_E is, for example, a random access memory of the "SDRAM" (acronym well known to the person skilled in the art of "Synchronous Dynamic Random Access Memory") type, or any other type of adapted memory.

The internal non-volatile memory NVM_I is for example an EEPROM memory or a "Flash" memory, or any other type of adapted memory, integrated into the calculation unit UC.

The internal volatile memory RAM_I is for example a random access memory of the "AXIRAM" type adapted for a microcontroller bus of the AXI (acronym well known to the person skilled in the art of "Advanced eXtensible Interface") type, or any other type of adapted memory, integrated into the calculation unit UC.

When implementing a convolutional calculation, the convolution kernel weight data is stored in the internal non-volatile memory NVM_I or in the external non-volatile memory NVM_E; while the input data and the output data are contained in the internal volatile memory RAM_I or in the external volatile memory RAM_E.

The calculation unit UC is adapted to implement convolutional calculations, as defined above, that is to say in particular operations of multiplication and accumulation between input data and weight data, resulting in an output data feature card.

The processing means of the state machine ME are configured to manage the calculation performed by the calculation unit UC, according to a convolutional calculation management method as described above in relation to FIGS. 1 to 4.

In particular, the processing means of the state machine ME are configured to identify 110 (FIGS. 1 and 2) the size of a memory location available in a temporary working memory of the calculation unit; to pre-load 130 (FIGS. 1 and 2) in the temporary working memory a maximum number of convolution kernels that can be stored at this size; and to control 140 (FIGS. 1 and 2) the calculation unit to calculate the set of output data that can be calculated from pre-loaded convolution kernels.

In this regard, the state machine ME is capable of generating signals controlling the calculation unit UC, in particular for the identification of the size of the memory location available in the temporary working memory; and is capable of generating memory access controls, in particular for selecting and accessing input data blocks to be loaded, and convolution kernels to be pre-loaded.

The processing means of the state machine ME can be "hard" configured in this regard, that is to say by construction of the logic circuit implementing the decision tree of the method, for example as illustrated by FIG. 2, and advantageously in an optimized and accelerated manner.

The processing means can also be software configured in this regard, by means of a program, for example recorded on a computer medium, comprising instructions which, during an execution of the program, drive the state machine ME to implement the method. In this case, the processing means are typically integrated into a microcontroller or microprocessor integrated circuit, which may also incorporate the calculation unit UC.

The implementations described in relation to FIGS. 1 to 4 and the embodiments described in relation to FIG. 6 allow, thanks to an optimal use of the temporary working memory, greatly optimizing the execution of the convolutional layers of the neuronal networks, a great reduction in the inference time of the neural network, very close to the theoretical limit in terms of cycle by multiplication and accumulation operation, and without increasing the volatile memory RAM_I, RAM_E nor the non-volatile memory NVM_I, NVM_E.

The advantageous results of the implementations and embodiments, shown in Table 1, have in particular no condition on the location of the weight data (that is to say in the internal or external non-volatile memory), or on the location of the input data (that is to say in the internal or external volatile memory).

The reduction of the inference time allows in particular a reduction in energy consumption, a less expensive use of microcontrollers, more complex use cases, and always without increasing the memories, nor degrading the performances for example in terms of precision.

Furthermore, the implementations and embodiments are compatible with any type of topology of convolutional neural networks, and are indeed independent of the microprocessor or microcontroller used, are independent of the bit width of the data (for example floating-point 32-bit data, 8 quantized bits, or less).

What is claimed is:

1. A method for managing a convolutional calculation carried out by a calculation circuit adapted to calculate output data on output channels from convolution kernels applied to input data blocks on at least one input channel, wherein calculations on each input data block correspond respectively to an output datum on an output channel, and wherein the calculations with each convolution kernel correspond to the output data on each output channel respectively, the method comprising:

identifying a size of a memory location available in a temporary working memory of the calculation circuit;
    determining whether the temporary working memory has sufficient capacity for storing a desired number of convolutional kernels for a current convolutional layer;
    allocating a memory location of a buffer memory of the calculation circuit having a size of a minimum size threshold in response to determining that the temporary working memory lacks sufficient capacity and that the size of the memory location available in the temporary working memory is smaller than the minimum size threshold;
    pre-loading a maximum number of the convolution kernels storable in the allocated memory location of the buffer memory, wherein the pre-loading occurs after the allocating step and uses the allocated buffer memory, and wherein the maximum number is determined by the available space within the allocated memory location; and
    controlling the calculation circuit to calculate a set of output data calculable from the convolution kernels pre-loaded in the allocated buffer memory.

2. The method according to claim 1, wherein controlling the calculation circuit to calculate the set of output data comprises successively loading, in the calculation circuit, the input data blocks corresponding to the set of output data.

3. The method according to claim 1, further comprising repeatedly pre-loading in the temporary working memory the maximum number of the convolution kernels and repeatedly controlling the calculation circuit to calculate the set of the output data until the set of output data in all output channels is calculated.

4. The method according to claim 1, wherein the set of output data corresponds to a maximum size of the output data receivable at one time in each output channel, and wherein the set comprises an entire output data of each output channel or only a segment of the output data of each output channel.

5. The method according to claim 4, wherein the segment of the output data of each output channel corresponds to a row or a packet of rows of output data.

6. The method according to claim 4, wherein, in response to the set only comprising the segment of the output data of each output channel:

repeatedly preloading convolution kernels that are different from those of the previous pre-loading and repeatedly controlling for the same segment, until all the output data of the segment is calculated for all output channels; and
    renewing preloading for other segments, until all the output data in all other segments of all the output channels is calculated.

7. The method according to claim 1, wherein the convolution kernels comprise weight data, and wherein pre-loading comprises reorganizing the weight data of the convolution kernels to optimize the calculation of the output data.

8. The method according to claim 1, wherein the convolution kernels comprise weight data, and wherein controlling the calculation circuit to calculate the set of output data comprises multiplying and accumulating the input data block loaded with the weight data of the pre-loaded convolution kernels.

9. The method according to claim 1, further comprising, before pre-loading the convolution kernels in the temporary working memory, storing the convolution kernels in a non-volatile memory internal or external to the calculation circuit, and, while controlling the calculation circuit, storing the input data and the output data in the volatile memory internal or external to the calculation circuit.

10. A device comprising:

a calculation circuit configured to calculate output data on output channels from convolution kernels applied to input data blocks on at least one input channel so that calculations on each input data block correspond respectively to each output datum on the output channels, and so that calculations with each convolution kernel correspond to the output data on each output channel respectively; and
    a processor configured to manage a convolutional calculation performed by the calculation circuit,
    wherein the processor is further configured for:
        identifying a size of a memory location available in a temporary working memory of the calculation circuit;
        determining whether the temporary working memory has sufficient capacity for storing a desired number of convolutional kernels for a current convolutional layer;

allocating a memory location of a buffer memory of the calculation circuit having a size of a minimum size threshold in response to determining that the temporary working memory lacks sufficient capacity and that the size of the memory location available in the temporary working memory is smaller than the minimum size threshold;

pre-loading a maximum number of the convolution kernels storable in the allocated memory location of the buffer memory, wherein pre-loading occurs after allocating and uses the allocated buffer memory, and wherein the maximum number is determined by the available space within the allocated memory location; and controlling the calculation circuit to calculate a set of output data calculable from the convolution kernels pre-loaded in the allocated buffer memory.

11. The device according to claim 10, wherein the processor is configured for controlling the calculation circuit to calculate the set of output data from the pre-loaded convolution kernels by successively loading the input data blocks corresponding to the set of output data in the calculation circuit.

12. The device according to claim 10, wherein the processor is configured for repeatedly pre-loading in the temporary working memory the maximum number of the convolution kernels and repeatedly controlling the calculation circuit to calculate the set of output data until the set of output data in all output channels is calculated.

13. The device according to claim 10, wherein the set of output data corresponds to a maximum size of the output data receivable at one time in each output channel, and wherein the set of output data comprises an entire output data of each output channel, or only a segment of the output data of each output channel.

14. The device according to claim 13, wherein the segment of the output data of each output channel corresponds to a row or to a packet of rows of each output channel.

15. The device according to claim 13, wherein the processor is configured for:

repeating pre-loading with the convolution kernels different from those of the previous pre-loading and repeating the controlling for the same segment until all the output data of the segment is calculated for all output channels in response to the set of output data only comprising the segment; and renewing preloading for other segments, until all the output data in all other segments of all the output channels is calculated.

16. The device according to claim 10, wherein the convolution kernels comprise weight data, and wherein the processor is configured for, during pre-loading, reorganizing the weight data of the convolution kernels and for optimizing the calculation of the output data by the calculation circuit.

17. The device according to claim 10, wherein the convolution kernels comprise weight data, and wherein the calculation circuit is configured for calculating the output data by multiplying and accumulating the input data of the blocks loaded with the weight data of the pre-loaded convolution kernels.

18. A non-transitory computer readable storage medium comprising instructions for managing a convolutional calculation carried out by a calculation circuit adapted to calculate output data on output channels from convolution kernels applied to input data blocks on at least one input channel, wherein calculations on each input data block correspond respectively to an output datum on an output channel, and wherein the calculations with each convolution kernel correspond to the output data on each output channel respectively, the instructions, when executed by a processor, cause the processor to:

identify a size of a memory location available in a temporary working memory of the calculation circuit;

determine whether the temporary working memory has sufficient capacity for storing a desired number of convolutional kernels for a current convolutional layer;

allocate a memory location of a buffer memory of the calculation circuit having a size of a minimum size threshold in response to determining that the temporary working memory lacks sufficient capacity and that the size of the memory location available in the temporary working memory is smaller than the minimum size threshold;

pre-load a maximum number of the convolution kernels storable in the allocated memory location of the buffer memory, wherein pre-loading occurs after the allocating step and uses the allocated buffer memory, and wherein the maximum number is determined by the available space within the allocated memory location; and control the calculation circuit to calculate a set of output data calculable from the convolution kernels pre-loaded in the allocated buffer memory.

19. The non-transitory computer readable medium of claim 18, wherein controlling the calculation circuit to calculate the set of output data comprises successively loading, in the calculation circuit, the input data blocks corresponding to the set of output data.

20. The non-transitory computer readable medium of claim 18, wherein the instructions, when executed by a processor, cause the processor to repeatedly pre-loading in the temporary working memory the maximum number of the convolution kernels and repeatedly controlling the calculation circuit to calculate the set of the output data until the set of output data in all output channels is calculated.

\*  \*  \*  \*  \*